United States Patent [19]

Laws

[11] E Re. 30,826

[45] Reissued Dec. 15, 1981

[54] INSTRUMENT FOR AIR IONIZATION

[76] Inventor: Cecil A. Laws, P.O. Box 1, Oxted, Surrey, England

[21] Appl. No.: 45,826

[22] Filed: Jun. 5, 1979

Related U.S. Patent Documents

Reissue of:

[64] Patent No.: 4,139,879
Issued: Feb. 13, 1979
Appl. No.: 875,232
Filed: Feb. 6, 1978

[30] Foreign Application Priority Data

Feb. 5, 1977 [GB] United Kingdom ..... 4824/77
Feb. 17, 1977 [GB] United Kingdom ..... 6602/77

[51] Int. Cl.[3] ..... H01T 19/00
[52] U.S. Cl. ..... 361/230; 361/231
[58] Field of Search ..... 361/212, 213, 214, 220, 361/225, 229, 230, 231; 250/324–326

[56] References Cited

U.S. PATENT DOCUMENTS

| | | | |
|---|---|---|---|
| 2,925,534 | 2/1960 | Ferguson, Jr. | 361/231 |
| 3,234,432 | 2/1966 | Streib | 361/231 |
| 3,581,149 | 5/1971 | Tanaka et al. | 250/326 X |
| 3,582,711 | 6/1971 | Jahnke | 361/231 |
| 3,818,269 | 6/1974 | Stark | 361/231 |
| 3,880,514 | 4/1975 | Kuehnle | 250/324 X |
| 3,968,405 | 7/1976 | Testone | 361/220 |
| 4,092,543 | 5/1978 | Levy | 361/213 |

FOREIGN PATENT DOCUMENTS

| | | |
|---|---|---|
| 910948 | 11/1962 | United Kingdom . |
| 911787 | 11/1962 | United Kingdom . |
| 1195331 | 6/1970 | United Kingdom . |

*Primary Examiner*—Harry E. Moose, Jr.
*Attorney, Agent, or Firm*—Tilton, Fallon, Lungmus & Chestnut

[57] ABSTRACT

An air ionizer is provided of the type in which a corona discharge is produced at the point of a sharp 'needle' by connecting it to a source of high potential. One or more needles, mounted in an insulator, point in a direction opposite to the eventual flow of air ions. At ions emitted from the point of the needle are reflected by a reflector. The reflector may comprise a sheet of insulating material or an electrically conductive material, e.g. a metal, mounted on insulators. The reflector may be provided with perforations for the passage of air therethrough such that the ionizer may, with advantage, be placed in a moving air stream. The insulator on which the needle(s) is or are mounted may comprise a polythene cable or a printed circuit board.

10 Claims, 13 Drawing Figures

INSTRUMENT FOR AIR IONIZATION

Matter enclosed in heavy brackets [ ] appears in the original patent but forms no part of this reissue specification; matter printed in italics indicates the additions made by reissue.

This invention relates to air ionizers of the type in which a corona discharge is produced at the point of a sharp 'needle' by connecting it to a source of high potential, typically 3000 to 6000 volts. The corona gives rise to a stream of electrically charged air molecules, or ions, the sign of which corresponds to the sign of the potential applied to the 'needle.' The ions are propelled into the surrounding air by the well known 'electric wind' effect.

It is usual in such ionizers for the 'needle' to be mounted so that the stream of ionized air leaving its point flows directly into the adjacent air-space for breathing. The needle is therefore pointing towards the patient or other recipient and, unless protected, can be dangerous mechanically, as a sharp point, and in some cases electrically, because of its high potential. It is of course usual to incorporate a current limiting device in the electrical supply to the needle, but sensitive people can sometimes find electrical contact with the needle disturbing. Since anything in the nature of a protective grill placed over the needle will completely stop the flow of ions, it is usual in such instruments for the needle(s) to remain largely unprotected.

The object of the present invention is to provide full protection for the 'needle,' or 'needles,' whilst still retaining an unimpeded flow of air ions.

According to the present invention, in a first aspect thereof, an instrument for air ionization comprises a needle mounted in an insulator, the needle, in operation of the instrument, being connected to a source of high potential, and being directed towards an air ion reflector, in a direction opposite to that in which the eventual flow of air ions is required.

The air ion reflector may comprise a sheet of insulating material. Alternatively the air ion reflector may be made of an electrically conductive material, preferably a metal, and mounted on insulating means.

Desirably the air ion reflector has perforations to permit the passage of air therethrough.

An instrument embodying the invention, and modifications thereof, will now be described, by way of example only, with reference to the accompanying diagrammatic drawings, in which.

Figure 1:
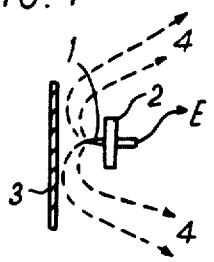
FIG. 1 is a side view of the said instrument.

Referring first to FIG. 1. A 'needle' 1, mounted in an insulator 2, and connected to a suitable source of high potential E, is directed towards an air ion reflector in the form of a plate 3 in a direction opposite to that in which the eventual flow of air ions is required. The point of the needle is therefore directed away from the user so that the risk of injury by accidental contact direct from the front is removed. Air ions emitted at the needle tip impinge on the plate 3 and a surface charge of static electricity, having the same sign as that of the ions, is established. A state of equilibrium is quickly reached in which only a small number of ions, sufficient to compensate for any leakage from the surface, continue to reach plate 3, the vast majority being deflected back in the opposite direction by virtue of the repulsion effect of the electrostatic field created by the charged surface. The plate 3 therefore acts as an electrostatic reflector or 'mirror,' enabling the air ions to be deflected in a direction substantially opposite to that in which the needle is pointing. The plate 3 may comprise a sheet of insulating material, or alternatively it may comprise a conductive material, such as a metal, mounted on suitable insulating means (not shown).

Figure 2:
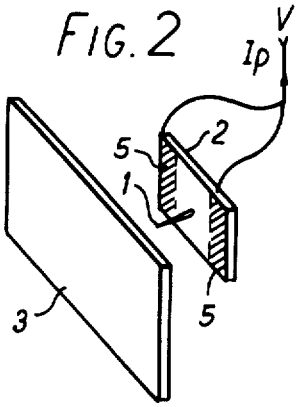
FIG. 2 is a perspective view of a first said modification.
Figure 3:
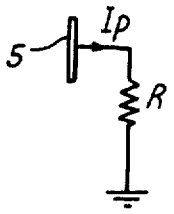
FIG. 3 shows a bias circuit for use with the said instrument.

In practice, the electrostatic charge laid down on plate 3 and on insulator 2, being of the same sign and of comparable potential to that of needle 1, operate to reduce the field strength at the needle tip to below that at which the corona discharge can be maintained. With a needle in free space the necessary field exists by virtue of the difference in potential between the needle and its surroundings, or 'earth'. The necessary field is therefore restored by introducing one or more conductive plates 5 (FIG. 2) in suitable proximity to the needle tip, plates 5 being held at earth or other suitable potential. One consequence of this is that an ion current Ip flows from the needle tip to plates 5. Under some conditions current Ip can reach a magnitude such that unacceptable amounts of ozone are produced. As a further feature of this invention, current Ip is controlled at an acceptable value by applying a suitable bias potential V, of the same sign as potential E to plates 5. This bias potential can be derived from an external source, or developed automatically from a self regulating bias circuit consisting of a very high value resistor R connected between plates 5 and earth (FIG. 3). This function is best performed by making use of the reverse voltage characteristics of a small silicon high voltage rectifier which meets the necessary requirements of very small leakage current and high operating voltage. In addition, the onset of the avalanche condition serves to limit the maximum potential which can be acquired by plates 5 under fault conditions. The potential developed across resistor, or rectifier R, finds an equilibrium point when it reaches a value at which the ion current drawn is just sufficient to maintain it. This follows from the fact that the ion current Ip, falls off as the plate bias potential V rises. The circuit therefore provides an automatic control of plate bias and therefore of ozone level, the operating point being determined by the choice of the resistor or rectifier R.

Figure 4:
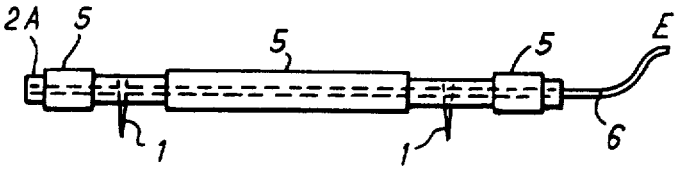
FIGS. 4 to 6 illustrate a second said modification.
Figure 5:
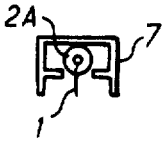
Figure 6:
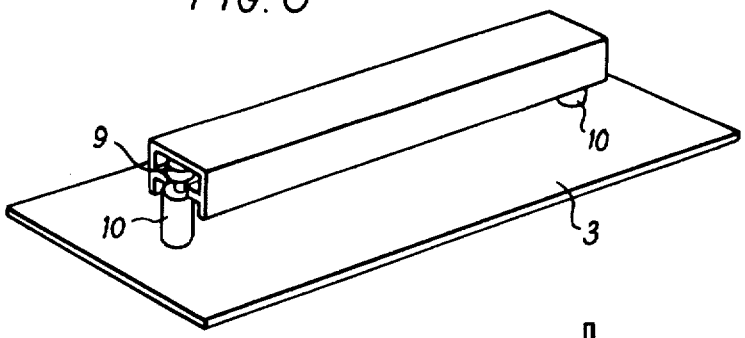

FIGS. 4 to 6 illustrate one practical modification of the invention. The insulator 2, in FIG. 2, is replaced by a length of polythene insulated cable 2A, the needle, or needles 1, being pushed through the insulation so as to contact the central wire 6, as shown in FIG. 4. Plates 5 can, for example, take the form of foil or other conductive wrappings round the polythene insulation. This assembly may then be mounted in a simple plastics extrusion 7 (FIG. 5) which may then be mounted over plate 3 (FIG. 6) on members or pillars 10. Connection to the needles, via conductor 6 in cable 2A, is effected via one mounting screw 9, and that to the plates 5, via the other mounting screw 9. By keeping the spacing between extrusion 7 and insulator panel 3 small, the needles 1, are fully protected.

The underside of plate 3 may be used for mounting the electrical components of the high potential supply circuit providing the probe potentials E and, where required, bias potential V. When necessary this can take the form of a printed circuit board. The complete assembly may then be mounted in a box, or as required.

Figure 7:
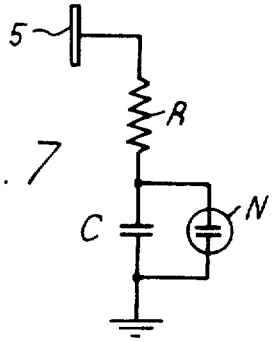
FIG. 7 shows an indicator for use with the said instrument.
Figure 8:
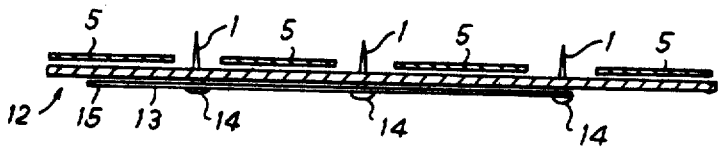
FIGS. 8 to 11 illustrate a third said modification.
Figure 9:
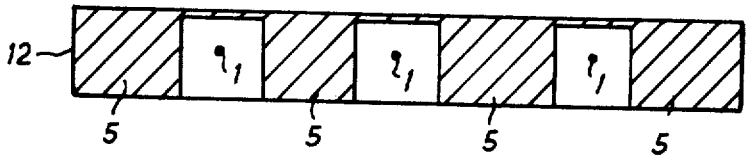
Figure 10:
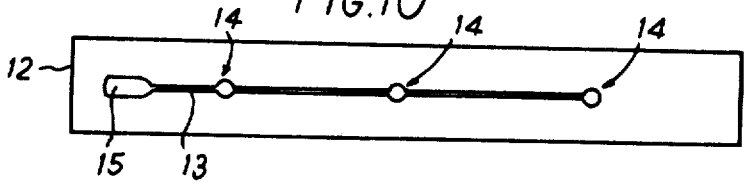
Figure 11:
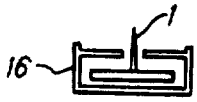

The small current Ip collected by the plates 5, or their equivalents on an alternative printed circuit assembly, can be used to operate an indicator consisting of a small neon lamp N and capacitor C (FIG. 7) and preferably a ballast resistor R. In operation, the current Ip serves to charge the capacitor C to a potential sufficient to trigger the neon lamp N, whereupon the capacitor is discharged through the neon lamp, which then ceases to conduct. The capacitor C then charges again and the cycle is repeated. The rate at which the neon lamp flashes is a measure of current Ip, and therefore of the efficiency of the circuit operation.

A further practical modification of the invention is illustrated in FIGS. 8 to 11 where a printed circuit board is used instead of the polythene cable referred to in FIG. 4.

In this modification, a printed circuit board of known type 12, having conductive foil on both surfaces is etched on one surface (FIG. 9) to produce the required number of plates 5, all interconnected and being suitably spaced to allow needles 1 to be mounted in holes drilled in the insulating board between them. On the other side of the board (FIG. 10) the conductive foil is etched away so as to leave a thin conductive strip 13 having pads 14 to which the undersides of the needle are soldered, and pad 15 for connection to the supply. The needle points therefore project upwards between the plates 5, as in side elevation FIG. 8. The complete strip may be mounted in a suitable moulded housing 16, as shown in FIG. 11 and again mounted, for example, in the manner shown in FIG. 6. The surface of the plate 3, may in either case be flat as illustrated or alternatively it can be curved in a convex or concave manner to give a preferred distribution of the reflected ions.

Figure 12:
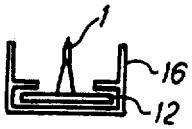
FIGS. 12 and 13 show respectively sectional and perspective views of a fourth said modification.
Figure 13:
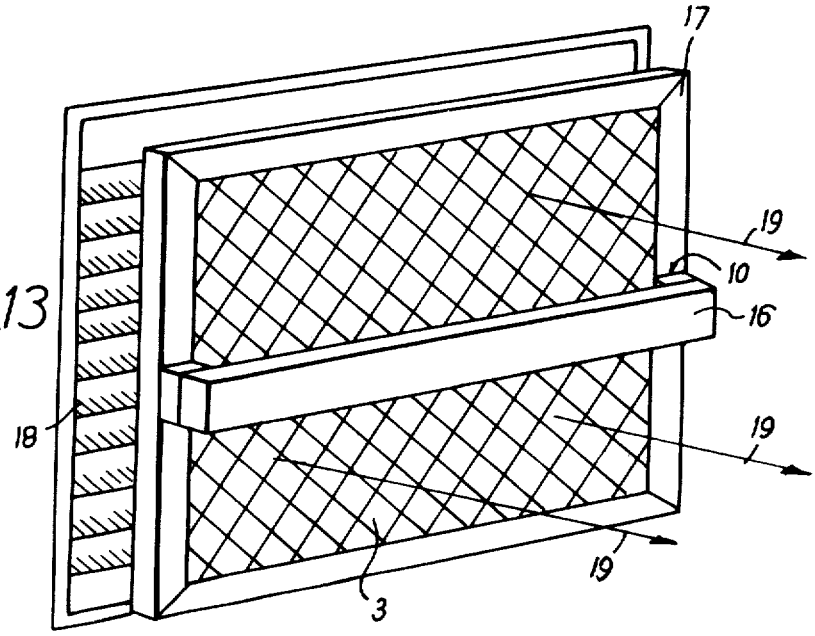

FIGS. 12 and 13 provide for applications in which it is required to mount the ionizer instrument in a moving air stream for the purpose of ionizing the air flowing past it. For example, it may be required to ionize the air emerging from a ventilation or heating duct into a living room, office or other space.

In such a case, the plate 3 may present an obstruction to the moving air, thus preventing it from passing effectively through the ionization area between the said plate and the needle assembly. In the present invention this limitation is overcome by constructing the plate 3 from a suitable material having perforations through which the moving air can pass. These can take any suitable form, such as closely spaced holes or slots, or the material can take the form or wire or metal mesh mounted on suitable insulators.

A needle assembly, making use of a printed circuit board 12 (FIG. 12), is mounted in a suitably moulded housing 16. Such an assembly may have any required number of needles 1, consistent with the total length of the assembly. As shown in FIG. 13, the assembly is then mounted on two members 10, secured to a rectangular frame, 17, in such a way that the needles are facing towards the frame. In the illustration a wire mesh, constituting the plate 3 is mounted in frame, 17, the frame itself or suitable inserts, serving to insulate the mesh electrically. The complete assembly is then mounted over a ventilating or heating duct, terminating in a conventional grill fitting 18. Air emerging from the grill therefore passes through the mesh 3, and thus through the ionizing area, as indicated by the arrows 19.

The design of the ionizer and reflector assembly can, of course, be adapted to conform to any size or shape of duct or grill, and more than one housing 16 containing ionizing means may be employed. Again, the ionizer/reflector assembly may be designed to fit in front of a fan, or blower unit instead of a duct, or it may be mounted over a heater, radiator, or similar device producing a moving current of air. The unit may be designed to fit over a window vent through which air is drawn by an extractor fan mounted elsewhere.

I claim:

1. An instrument for air ionization comprising a needle mounted in an insulator *and having a pointed end,* and an air ion reflector, the needle, in operation of the instrument, being connected to a source of high potential, and *the needle point* being directed towards said air ion reflector, in a direction opposite to that in which the eventual flow of air ions is required.

2. An instrument according to claim 1, wherein said air ion reflector comprises a sheet of insulating material.

3. An instrument according to claim 1, wherein said air ion reflector comprises an electrically conductive material, mounted on insulating means.

4. An instrument according to claim 3, wherein said electrically conductive material is a metal.

5. An instrument according to claim 1, wherein said air ion reflector has perforations for the passage of air therethrough.

6. An instrument according to claim 1, wherein at least one conductive plate is placed in proximity to the point of said needle.

7. An instrument according to claim 6, wherein a bias circuit is connected between said at least one conductive plate and earth.

8. An instrument according to claim 6, further comprising an indicator for indicating the efficiency of operation in use of the said instrument, wherein said at least one conductive plate is connected to said indicator.

9. An instrument according to claim 1, wherein said insulator comprises a polythene cable.

10. An instrument according to claim 1, wherein said insulator comprises a printed circuit board.

* * * * *